United States Patent
Roth et al.

[15] 3,694,545
[45] Sept. 26, 1972

[54] THREE-PHASE AEROSOL SPRAYING SYSTEM

[72] Inventors: Willi Roth, Strengelbach, Aarau; Otto Erwin Schenk, Basel, both of Switzerland

[73] Assignee: J. R. Geigy A.G., Basel, Switzerland

[22] Filed: Sept. 20, 1963

[21] Appl. No.: 310,493

[52] U.S. Cl. ................................................ 424/45
[51] Int. Cl. .............................................. A61k 9/00
[58] Field of Search ...................................... 414/45

[56] References Cited

FOREIGN PATENTS OR APPLICATIONS 993,738  6/1965  Great Britain ............... 167/39
929,785  7/1947  France ......................... 167/39

*Primary Examiner*—Jerome D. Goldberg
*Assistant Examiner*—Vincent D. Turner
*Attorney*—Wenderoth, Lind & Ponack

[57] ABSTRACT

An improvement is provided in a system comprising a pressure vessel and a sprayable mixture contained therein under pressure. The mixture consists essentially of a water-in-oil type emulsion containing the active ingredients to be sprayed, the continuous phase of which emulsion consists of organic solvent containing a propellant which is liquid under pressure. The improvement resides in the fact that the continuous phase of the said emulsion consists essentially of dimethoxymethane.

3 Claims, No Drawings

THREE-PHASE AEROSOL SPRAYING SYSTEM

The present invention relates to improved three-phase aerosol spraying systems consisting of a pressure vessel containing a mixture which may be sprayed under pressure, this mixture being an emulsion of the water-in-oil type which contains the active substances to be sprayed either dissolved or dispersed therein and the emulsion contains an organic solvent and a liquefied propellant in addition to water.

To combat flying insects, it is known that it is necessary to have the finest possible distribution in space of the active ingredients which corresponds to an average particle size in the range of from 1 to 50 microns, such as can be attained with the aid of aerosols containing a high proportion of liquefied propellant gases. This type of aerosol is relatively costly; that is why attempts have been made to work out mixtures having only a relatively small proportion of propellant gas to attain a sufficiently fine spray, which attempts, for obvious reasons, were largely directed at the use of water as dispersion medium for the active ingredient.

A first advance in the direction of successful spraying with aqueous products was attained with the so-called "three-phase aerosols," in which the liquefied propellant is placed, depending on its specific weight, either above or below the aqueous phase to be sprayed. The degree of spray attained with this type of aerosol, even when using special spray nozzles, is suitable, at best, for the spraying of surfaces but not for fine spraying into space such as is necessary for combatting flying insects as mentioned above. Other aerosols suggested for the spraying of aqueous mixtures are types in which the mixture to be sprayed is an oil-in-water emulsion. In this case, the liquefied propellant gas is dissolved in the inner oily phase of the system whereby, due to the evaporation of the propellant dissolved in the oily phase, strong foam formation occurs when pressure is reduced at the nozzle causing the propellant dissolved in the oily phase to evaporate, such a formulation is hardly suitable for attaining the desired fine spray.

Finally, aerosols containing a water-in-oil emulsion as sprayable mixture have been suggested for the obtainment of the desired fine spray. In water-in-oil emulsions, the exterior phase consists of lipophilic components, and consequently, the liquefied propellants, which are also lipophilic, mix well with such an emulsion. This is of great advantage in the preparation of such types of aerosol because, after the addition of the propellant, no intensive mixing process is necessary to attain a homogenous mixture. Also, with such systems, there is hardly ever a disturbing foam formation.

Suggested formulations of sprayable mixtures of the water-in-oil type generally consist of a relatively high boiling organic solvent containing the active ingredients such as, e.g. insecticides, in which solvent water is distributed in fine droplets with the aid of a suitable emulsifier, and of the liquefied propellant contained in the organic solvent and also distributed in water. Such sprayable mixtures formulated in this way have only limited stability and are only stable for a few hours, even when mixed particularly carefully.

Particularly fine sprayability of such mixtures can also not be attained with special nozzles.

It has now been found that, instead of the hitherto suggested organic solvents making up the oil-phase in these emulsions, dimethoxymethane used as the oil-phase in a sprayable mixture of the water-in-oil type leads to considerably better sprayability and better stability of the emulsion even when the proportion of propellant gas in the mixture is kept relatively low, namely at from about 20 to not more than 50 percent and preferably 20–30 percent by weight, calculated on the total weight of the sprayable mixture.

The improvement according to the invention consists of a novel filling for conventional atomizers (pressure vessel fitted with a spray nozzle), which comprises a mixture based on an emulsion of the water-in-oil type containing the solid and/or liquid active ingredients to be sprayed, the continuous (external) phase of which emulsion consists of a mixture of organic solvent including a propellant which is largely liquefied under the pressure prevailing in the atomizer, and which further contains, as the continuous phase of the emulsion, dimethoxymethane in an amount of 5 to 75 percent, and preferably 10 to 60 percent by weight, calculated on the total weight of the sprayable mixture, as stability- and sprayability-improving agent.

In principle, the mixture in the system according to the invention can contain active ingredients of any type such as, e.g. pest control agents, pharmaceuticals etc. dissolved or dispersed in the water-in-oil emulsion. In particular the mixture is suitable for the fine-spraying of insecticides, because a high degree of distribution, in the order of 1 to 50 $\mu$ average particle size is attained with a relatively low proportion of propellant gas, e.g. from about 5 to 50 percent by weight, calculated on the total weight of the mixture.

The mixture for the combatting of flying insects, according to the invention is composed, in addition to its content of water, of the following ingredients:

a. Insecticides, which are soluble in the aqueous or in the oil phase or both and which make up 0.05–10 percent by weight, calculated on the total weight of the mixture to be sprayed;
insecticides of the following classes are suitable:
natural and semi-synthetic insecticides such as, e.g. pyrethrum, Derris, pyrethroids etc.
synthetic insecticides, e.g. chlorinated hydrocarbons, phosphoric acid esters, thio- and dithio- phosphoric acid esters, phosphonic acid esters, phosphoric acid ester amides, carbamates, dithiocarbamates etc.

b. Dimethoxymethane, as the oil-phase, which amounts, preferably to 10–60 percent by weight of the whole mixture to be sprayed.

c. Interfacial active substances which effect the formation of the desired water-in-oil type emulsion between water and dimethoxymethane and which make up from about 0.5 to 5 percent by weight of total mixture to be sprayed, such as e.g. esters of saturated or unsaturated fatty acids of from 10 to 20 carbon atoms with polyhydric alkanols with from two to six carbon atoms such as sorbitan trioleate, glycerin monooleate, diethylene glycol monooleate and mixtures thereof.

d. Non-irritant and substantially non-toxic propellants, such as halogenated or unhalogenated gaseous aliphatic hydrocarbons and mixtures thereof which can be liquefied at 20°C by use of an excess pressure of at least 0.5 atmosphere, and below the permissible safe upper limit set by official standards: for example propane, butane, dichlorodifluoromethane and dichlorotetrafluoroethane satisfy these requirements. The amount of propellant necessary depends on the physical behavior of the propellant, on the type of nozzle and on the volume of the pressure vessel used; as mentioned above the proportion of propellant in the mixture is between 20 and 50 percent by weight.

In addition to these substances, the mixture for combatting flying insects, according to the invention, contained in conventional atomizers can also contain the following auxiliaries:

e. "Synergists" such as, e.g. 3,4-(methylenedioxy-6-propylbenzyl)-butyldiethylene glycol ether, succinic acid dibutyl ester etc., the amount of which depends on the insecticides to be synergized; generally it is from 1 to 10 times the amount calculated on the insecticide to be synergized. "Synergists" are substances which, although they have themselves no or only a slight insecticidal action, nevertheless bring about a noticeable increase in the activity of conventional insecticides with which they have been admixed.

f. Emulsion stabilizers, in amounts of from about 0.1 to 5 percent by weight of the total mixture. They assist in preventing the separation into phases of the water-in-oil emulsion due to increase in viscosity or micell formation. Examples are: mineral substances such as, e.g. highly dispersed silicic acids, bentonite etc., organic macromolecules such as, e.g. alginates, pectin substances cellulose derivatives, polyvinyl alcohols etc.

g. Corrosion inhibitors, in amounts of about 0.1 to 2.5 percent by weight of the mixture, for example, epoxides. The corrosion inhibitors bind any hydrohalic acids which may be formed by hydrolysis of halogenated propellants and so prevent corrosion of the aerosol containers.

h. Perfumes, in amounts of about 0.01 to 1 percent of the mixture, for example, ethereal oils, synthetic perfumes etc.

The following examples illustrate a few preferred forms of the mixture according to the invention. Parts are given therein as parts by weight where not otherwise stated. The relationship of parts by weight to parts by volume is as that of gram to cubic centimeters.

Example 1

| | |
|---|---|
| Hexachlorocyclohexane, γ-isomer | 1.25 parts |
| Pyrethrum extract 25% | 2.00 parts |
| 3,4-(methylenedioxy-6-propylbenzyl)-butyl-diethylene glycol ether | 2.50 parts |
| Citronella oil | 0.25 parts |
| Sorbitan monolaurate | 5.00 parts |
| Dimethoxymethane | 80.00 parts |
| Bentonite | 1.00 part |
| Water | 108.00 parts |
| Propane | 37.50 parts |
| Butane | 12.50 parts |

On the one hand, hexachlorocyclohexane, pyrethrum extract; 3,4-(methylenedioxy-6-propylbenzyl)-butyl diethyleneglycol ether, citronella oil and sorbitan monolaurate are dissolved in dimethoxymethane and on the other the bentonite is pasted in water. The aqueous bentonite suspension is then placed in a vessel, the organic insecticide solution is mixed in with intensive stirring with a homogenizing machine and the whole is stirred until a homogeneous water-in-oil emulsion is obtained. 200 parts of this emulsion are put into an aerosol container of 350 parts by volume capacity and then the valve is fixed. 12.5 parts of butane and 37.5 parts of propane are then forced in through the valve and the container is shaken for a short time to attain a homogeneous emulsion. This only shows a slight tendency to separate into phases after a few days and can easily be made homogeneous again by slight movement. The aerosol mixture can be perfectly and completely sprayed as a fine dry mist and is excellently suitable for the combatting of flies and midges. Its action is equal to that of an anhydrous formulation produced with the same insecticides having a proportion of propellant gas of 80 percent. In spite of a proportion of about 50 percent of inflammable substances, the spray mist cannot be ignited by an open flame.

Example 2

| | |
|---|---|
| 2-n-propyl-4-pyrimidyl-(6)-dimethylcarbamate | 1.0 parts |
| Pyrethrum extract 25% | 0.4 parts |
| Succinic acid dibutyl ester | 2.0 parts |
| N-(2-ethylhexyl)-bicyclo-(2,2,1)-5-heptene-2,3-dicarboximide | 1.0 parts |
| Lavender oil | 0.5 parts |
| Epoxydized sunflower oil | 0.5 parts |
| Diethylene glycol mono-oleate | 2.5 parts |
| Dimethoxymethane | 30.0 parts |
| Methyl cellulose | 0.1 parts |
| Water | 32.0 parts |
| Dichlorodifluoromethane | 30.0 parts |

On the one hand, 2-n-propyl-4-pyrimidyl-(6)-dimethylcarbamate, pyrethrum extract 25 percent, succinic acid dibutyl ester, N-(2-ethylhexyl)-bicyclo-(2,2,1)-5-heptene-2,3-dicarboximide, lavender oil, diethylene glycol mono-oleate and epoxydized sunflower oil are dissolved in dimethoxymethane and on the other, the methyl cellulose is dissolved in water. The methyl cellulose solution is placed in a vessel, the organic insecticide solution is mixed in with intensive stirring with a homogenizing machine and the whole is stirred until a homogeneous water-in-oil emulsion is obtained. 70 parts of this emulsion are then placed in an aerosol container of 220 parts by volume capacity and then the valve is fixed. 30 parts of dichlorodifluoromethane are then forced in through the valve and the container is shaken for a short time whereupon a homogeneous emulsion is obtained. It only has a slight tendency to separate into phases after a few days but can easily be made homogeneous again by a short movement. The aerosol mixture can be sprayed as a fine dry mist and is excellently suitable for the combatting of flies and midges. Its action is equal to that of an anhydrous formulation produced with the same insecticides having a proportion of propellant gas of 80 percent. In spite of a proportion of about 30 percent of inflammable substances, the spray mist cannot be ignited by an open flame.

Example 3

| | |
|---|---|
| Dimethoxydiphenyltrichloroethane | 5.0 parts |
| Chrysanthemum monocarboxylic acid-3-allyl- 2-methyl-4-oxo-2-cyclopentenyl-ester | 1.0 parts |
| n-octyl sulphoxide of isosafrole | 5.0 parts |
| Orange blossom oil | 0.4 parts |

| | |
|---|---|
| Epoxydized sunflower oil | 0.4 parts |
| Propylene glycol monolaurate | 5.0 parts |
| Sorbitan monolaurate | 5.0 parts |
| Dimethoxymethane | 60.0 parts |
| Na alginate | 0.2 parts |
| Water | 78.0 parts |
| Propane | 20.0 parts |
| Dichlorodifluoromethane | 20.0 parts |

On the one hand, dimethoxydiphenyl-trichloroethane, chrysanthemum monocarboxylic acid-3-allyl-2-methyl-4-oxo-2-cyclo-pentyl ester, n-octyl sulphoxide of isosafrole, orange blossom oil, expoxydized sunflower oil, propylene glycol monolaurate and sorbitan monolaurate are dissolved in dimethoxymethane, and on the other, the Na-alginate is dissolved in water. The alginate solution is put into a vessel and the organic insecticide solution is mixed in while intensively stirring with a homogenizing machine and the whole is stirred until a homogeneous water-in-oil emulsion is formed. 160 parts of this emulsion are put into an aerosol container of 350 parts by volume capacity and the valve is fixed. 20 parts of dichlorodifluoromethane and 20 parts of propane are then forced in through the valve and the container is shaken for a short time. A homogeneous emulsion is formed which only shows a slight tendency to separate into phases after a few days but then can be made homogeneous again easily by slight movement. The aerosol mixture can be sprayed as a fine dry mist and is excellently suitable for the combatting of flies and midges. Its action is equal to that of an anhydrous formulation produced with the same insecticides having a proportion of propellant gas of 80 percent. In spite of a proportion of about 40 percent of inflammable substances, the spray mist cannot be ignited by an open flame.

Example 4

| | |
|---|---|
| 2-isopropyl-4-methyl-6-pyrimidyl-diethyl-thiophosphate | 3.750 parts |
| 1,2,3,4,10,10-hexachloro-6,7-epoxy-1,4,4a-5,6,7,8,8a-octahydro-1,4-endo-exo-5,8-di-methanonaphthalene | 1.250 parts |
| diethylene glycol monolaurate | 7.500 parts |
| sorbitan monolaurate | 7.500 parts |
| Lilly of the valley perfume oil | 0.125 parts |
| Dimethoxymethane | 86.250 parts |
| Polyvinyl alcohol | 1.125 parts |
| Hard water (with about a hardness corresponding to about 200 mg CaO per liter) | 92.500 parts |
| Propane | 25.000 parts |
| Butane | 25.000 parts |

On the one hand, 2-isopropyl-4-methyl-6-pyrimidyl-diethylthiophosphate, 1,2,3,4,10,10-hexachloro-6,7-epoxy-1,4,4a,5,6,7,8,8a-octahydro-1,4-endo-exo-5,8-dimethanonaphtalene, diethylene glycol monolaurate, sorbitan monolaurate and lily of the valley perfume oil are dissolved in dimethoxymethane and on the other, the polyvinyl alcohol is dissolved in the hard water (the salts causing hardness in the water serve as a potential alkali reserve for the stabilization of the phosphoric acid ester). The polyvinyl alcohol solution is placed in a vessel, the organic insecticide solution is mixed in while intensively stirring with a homogenizing machine and the whole is stirred until a homogeneous water-in-oil emulsion is formed. 200 parts of this emulsion are placed in an aerosol container of 350 parts by volume capacity and then the valve is fixed. 25 parts of butane and 25 parts of propane are then forced in through the valve and the container is shaken for a short time. A homogeneous emulsion is formed which only shows a slight tendency to separate into phases after a few days but which can easily be made homogeneous again by a slight movement. The aerosol mixture can by sprayed as a fine dry mist and is excellently suitable for the combatting of flies and midges. Its action is equal to that of an anhydrous formulation produced with the same insecticides having a proportion of propellant gas of 80 percent. In spite of a proportion of over 50 percent of inflammable substances, the spray mist cannot be ignited by an open flame.

What we claim is:

1. In a three-phase aerosol spraying system comprising an aerosol pressure container and a sprayable mixture contained therein under pressure, said sprayable mixture being in a partially liquid and partially gaseous phase and consisting essentially of
   1. a propellant which liquefies under pressure and
   2. a water-in-oil type emulsion having an organic solvent continuous phase and an aqueous discontinuous phase said emulsion containing an effective amount of an active ingredient to be sprayed, the improvement wherein the organic solvent of the said continuous phase is dimethoxymethane in an amount of from about 10 to 60 percent by weight of the sprayable mixture.

2. A system according to claim 4 wherein the amount of propellant is from about 20 to about 50 percent by weight of the sprayable mixture.

3. A sprayable mixture adapted for use in a three-phase aerosol spraying system which comprises
   a. from about 0.05 to 10 percent of an insecticide,
   b. from about 10 to 60 percent of dimethoxymethane,
   c. from about 0.5 to 5 percent of an ester of a member selected from the group consisting of a saturated and an unsaturated fatty acid, each having from 10 to 20 carbon atoms, with a polyhydric alkanol of from two to six carbon atoms,
   d. from about 20 to 50 percent of a propellant selected from the group consisting of a non-irritant substantially non-toxic aliphatic hydrocarbon and a halogenated aliphatic hydrocarbon, said propellant being liquefiable at 20°C under an excess pressure of at least 0.5 atmosphere; all percentages being by weight calculated on the total weight of said mixture, and
   e. the remainder water.

* * * * *